US010981638B2

(12) United States Patent
Redfern et al.

(10) Patent No.: US 10,981,638 B2
(45) Date of Patent: *Apr. 20, 2021

(54) ELECTRIC ACTUATOR FOR A MARINE STEERING SYSTEM

(71) Applicant: Marine Canada Acquisition Inc., Richmond (CA)

(72) Inventors: Richard Redfern, Chemainus (CA); Noam Davidson, Vancouver (CA); Mark Dyck, Delta (CA); Kevin Stopp, Richmond (CA); Mehdi Sadaghdar, Vancouver (CA)

(73) Assignee: Marine Canada Acquisition Inc., Richmond (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,676

(22) Filed: May 22, 2020

(65) Prior Publication Data

US 2020/0283112 A1    Sep. 10, 2020

Related U.S. Application Data

(63) Continuation of application No. 16/114,137, filed on Aug. 27, 2018, now Pat. No. 10,683,073.

(Continued)

(51) Int. Cl.
*B63H 20/12* (2006.01)
*F16H 25/22* (2006.01)
(Continued)

(52) U.S. Cl.
CPC ............. *B63H 20/12* (2013.01); *B63H 20/10* (2013.01); *B63H 25/02* (2013.01); *B63H 25/42* (2013.01);
(Continued)

(58) Field of Classification Search
CPC ........ B63H 20/12; B63H 20/10; B63H 25/02; B63H 25/42; B63H 2020/003
See application file for complete search history.

(56) References Cited

U.S. PATENT DOCUMENTS 2,476,376 A    7/1949  Roland
4,679,451 A    7/1987  Nakamura et al.
(Continued)

FOREIGN PATENT DOCUMENTS

EP    2128492 A1    12/2009
WO    9206891 A1    4/1992

OTHER PUBLICATIONS

European Search Report—dated Jul. 23, 2020—Corresponding EP U.S. Pat. No. 3672868.

*Primary Examiner* — S. Joseph Morano
*Assistant Examiner* — Jovon E Hayes
(74) *Attorney, Agent, or Firm* — Berenato & White, LLC

(57) ABSTRACT

An electric actuator for a marine steering system comprises a housing and an output shaft reciprocatingly received by the housing. There is a rotor disposed within the housing. The rotor is coupled to the output shaft of the electric actuator. Rotation of the rotor causing the output shaft of the electric actuator to reciprocate relative to the housing. There is a motor disposed within the housing. The motor has an output shaft coupled to the rotor. A longitudinal axis of the output shaft of the motor is parallel with a longitudinal axis of the output shaft of the electric actuator. There is also a drive mechanism disposed within the housing. The drive mechanism couples the output shaft of electric actuator to the rotor. The drive mechanism is on a plane radial to a longitudinal axis of the output shaft of the motor.

20 Claims, 15 Drawing Sheets

Related U.S. Application Data

(60) Provisional application No. 62/550,510, filed on Aug. 25, 2017.

(51) Int. Cl.
*B63H 20/10* (2006.01)
*B63H 25/02* (2006.01)
*B63H 25/42* (2006.01)
*F16H 21/44* (2006.01)
*F16H 25/20* (2006.01)
*B63H 20/00* (2006.01)

(52) U.S. Cl.
CPC ......... *F16H 21/44* (2013.01); *F16H 25/2247* (2013.01); *F16H 25/2252* (2013.01); *B63H 2020/003* (2013.01); *F16H 2025/209* (2013.01); *F16H 2025/2081* (2013.01); *F16H 2025/2096* (2013.01)

(56) References Cited

U.S. PATENT DOCUMENTS

| | | | |
|---|---|---|---|
| 5,910,692 A | 6/1999 | Saeda et al. | |
| 10,683,073 B2 | 6/2020 | Redfern et al. | |
| 2005/0170712 A1* | 8/2005 | Okuyama | B63H 20/12 440/59 |
| 2009/0260463 A1 | 10/2009 | Eukano | |
| 2012/0040572 A1 | 2/2012 | Ooshita et al. | |
| 2013/0292201 A1* | 11/2013 | Yamanaka | B23P 19/04 19/4 |
| 2015/0108823 A1* | 4/2015 | Figuered | B60K 17/356 301/6.4 |
| 2017/0106959 A1* | 4/2017 | Davidson | F16D 27/004 |

* cited by examiner

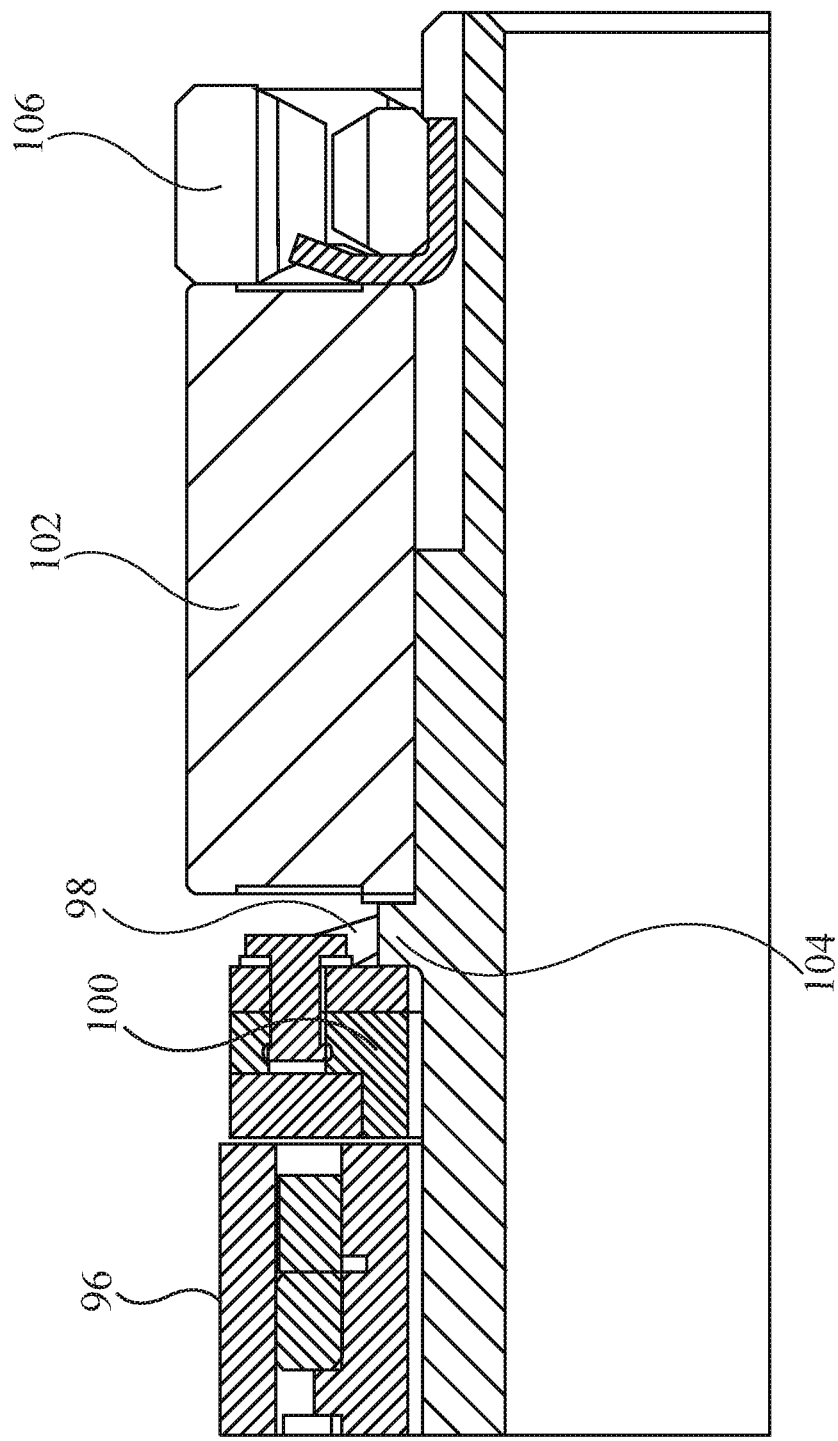

ELECTRIC ACTUATOR FOR A MARINE STEERING SYSTEM

BACKGROUND OF THE INVENTION

Field of the Invention

The present invention relates to an electric actuator and, in particular, to an electric actuator for a marine steering system.

Description of the Related Art

International Patent Application Publication No. WO/2016/004532 which was published on Jan. 14, 2016, in the name of Davidson et al., and the full disclosure of which is incorporated herein by reference, discloses a marine steering system comprising a propulsion unit including a tilt tube, a support rod received by the tilt tube, a tiller, and an electric actuator for imparting steering movement to the propulsion unit. The electric actuator includes a housing and an output shaft reciprocatingly received by the housing. The output shaft is partially threaded and has smooth surfaces. There is a motor disposed within the housing. The motor includes a stator and a rotor. Rotation of the rotor causes the output shaft to translate axially relative to the rotor and causes the output shaft to reciprocate relative to the housing. A pivot plate is pivotably connected to the tiller of the propulsion unit. The pivot plate rotationally constrains the housing of the electric actuator to provide reaction torque for rotation of the rotor. There are support arms which connect respective ends of the output shaft to the support rod of the propulsion unit. The support arms provide rotational constraint to the output shaft and the support arms inhibit axial movement of the output shaft relative to the marine vessel while the housing of the electric actuator reciprocates linearly along the output shaft.

SUMMARY OF THE INVENTION

There is provided an electric actuator for a marine steering system. The electric actuator comprises a housing and an output shaft reciprocatingly received by the housing. There is a rotor disposed within the housing. The rotor is coupled to the output shaft of the electric actuator. Rotation of the rotor causes the output shaft of the electric actuator to reciprocate relative to the housing. There is a motor disposed within the housing. The motor has an output shaft coupled to the rotor. A longitudinal axis of the output shaft of the motor is parallel with a longitudinal axis of the output shaft of the electric actuator. There is also a drive mechanism disposed within the housing. The drive mechanism couples the output shaft of electric actuator to the rotor. The drive mechanism is on a plane radial to a longitudinal axis of the output shaft of the motor.

The drive mechanism may be a tensioned drive mechanism. The drive mechanism may include a belt which couples the output shaft of the electric actuator to the rotor. The belt may be provided with a tensioner. The drive mechanism includes an idler gear which couples the output shaft of the electric actuator to the rotor. Wiring may be connected to the electric actuator along a longitudinal axis which is generally parallel to the longitudinal axis of the output shaft of the electric actuator.

The electric actuator may include a position sensor disposed on the rotor for sensing a position of the rotor. The position sensor may sense an actual steering position based on a position of the rotor. The position sensor may be a rotary position sensor. The position sensor may be a rotary position sensor that employs a gear reduction. The position sensor may be a rotary position sensor that employs a gear reduction so that a driven sensor gear never rotates more than one rotation.

The electric actuator may include a clutch directly coupled to the rotor. The clutch may function as a brake. The electric actuator may include a housing having a T-shaped profile with longitudinally extending arm portions.

There is also provided a steering system for a marine vessel. The steering system comprises a propulsion unit including a tilt tube, a support rod received by the tilt tube, a tiller, and an electric actuator. The electric actuator comprises a housing and an output shaft reciprocatingly received by the housing. There is a rotor disposed within the housing. The rotor is coupled to the output shaft of the electric actuator. Rotation of the rotor causing the output shaft of the electric actuator to reciprocate relative to the housing. There is a motor disposed within the housing. The motor has an output shaft coupled to the rotor. A longitudinal axis of the output shaft of the motor is parallel with a longitudinal axis of the output shaft of the electric actuator. There is also a drive mechanism disposed within the housing. The drive mechanism couples the output shaft of electric actuator to the rotor. The drive mechanism is on a plane radial to a longitudinal axis of the output shaft of the motor. There is a pivot plate is pivotably connected to the tiller of the propulsion unit. The pivot plate rotationally constrains the housing of the electric actuator to provide reaction torque for rotation of the rotor. Support arms connect respective ends of the output shaft to the support rod of the propulsion unit. The support arms provide rotational constraint to the output shaft and the support arms inhibiting axial movement of the output shaft relative to the marine vessel while the housing of the electric actuator reciprocates linearly along the output shaft. The motor of the electric actuator is disposed, relative to the marine vessel, in front of the output shaft of the electric actuator in the tilted down position and the tilted up position.

The electric actuator may be disposed under an engine pan of the propulsion unit and above a splashwell of the marine vessel in the tilted down position and the tilted up position. The housing of the electric actuator may be pivotable when the propulsion unit is pivotable. The housing may have a T-shaped profile with longitudinally extending arm portions, wherein one of the longitudinal extending arm portions overlaps a respective one of the support arms when the electric actuator strokes to a hard over position.

BRIEF DESCRIPTIONS OF DRAWINGS

The invention will be more readily understood from the following description of the embodiments thereof given, by way of example only, with reference to the accompanying drawings, in which:

FIG. 11 is a fragmentary sectional view of the electric actuator showing the brake thereof;

DESCRIPTIONS OF THE PREFERRED EMBODIMENTS

Figure 1:
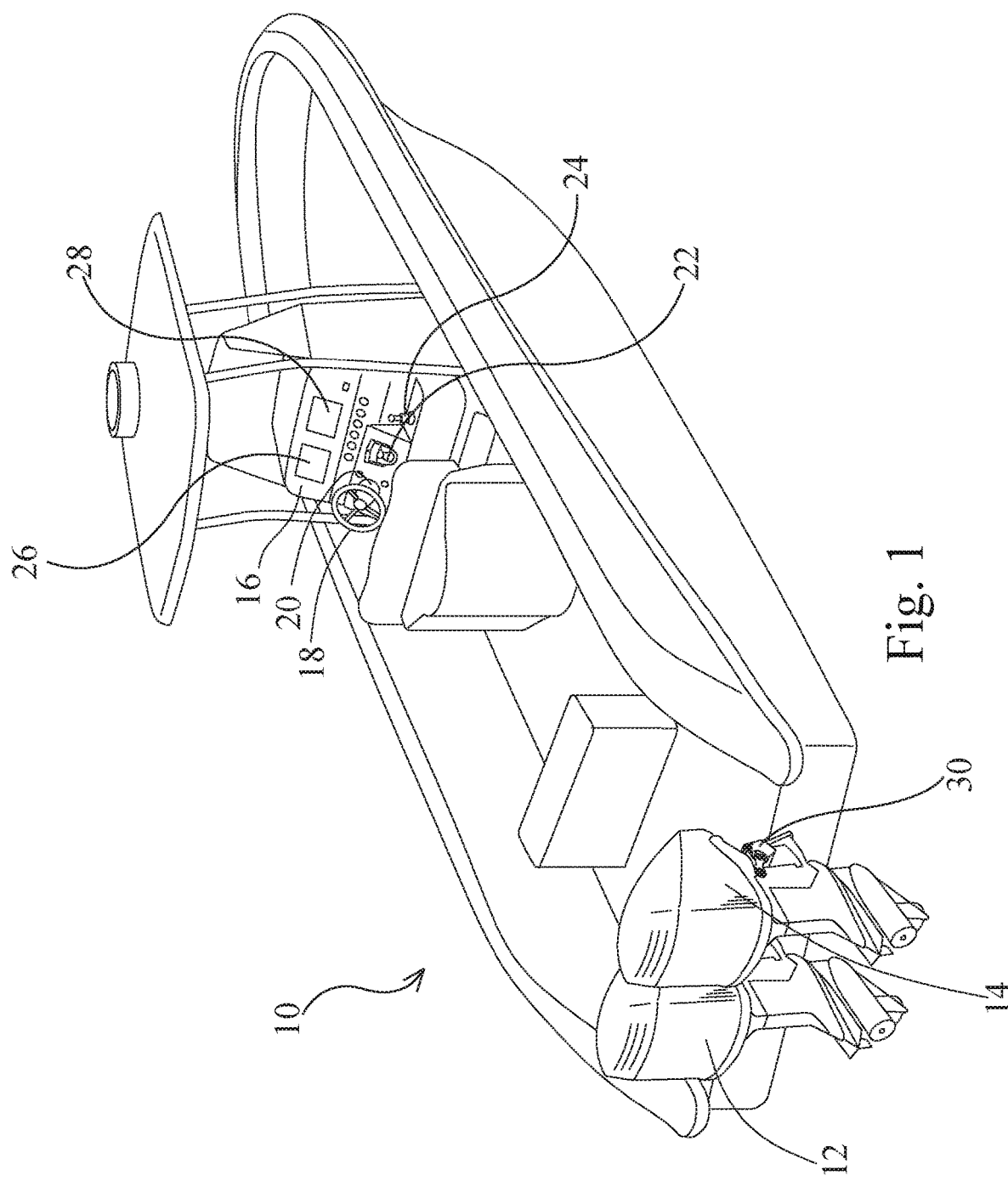
FIG. 1 is a perspective view of a marine vessel provided with a propulsion unit having an electric actuator.

Referring to the drawings and first to FIG. 1, there is shown a marine vessel 10 which is provided with a plurality of propulsion units which, in this example, are in the form of two outboard engines, namely, a port engine 12 and a starboard engine 14. However, in other examples, the propulsion units may be any number or form of propulsion units. The marine vessel 10 is also provided with a control station 16 that supports a steering wheel 18 mounted on a helm 20, a control head 22, and a joystick 24. The control station 16 is conventional and allows the port engine 12 and the starboard engine 14 to be steered using either the steering wheel 18 and the helm 20 or the joystick 24 as disclosed in PCT International Application Publication Number WO 2013/1123208 A1 which is incorporated herein by reference. The control station 16 further includes a first display interface 26 and a second display interface 28. In this example, the first display interface is a SIMRAD® display interface which displays navigational information and the second display interface is a BEP® display which displays onboard system information.

Figure 2:
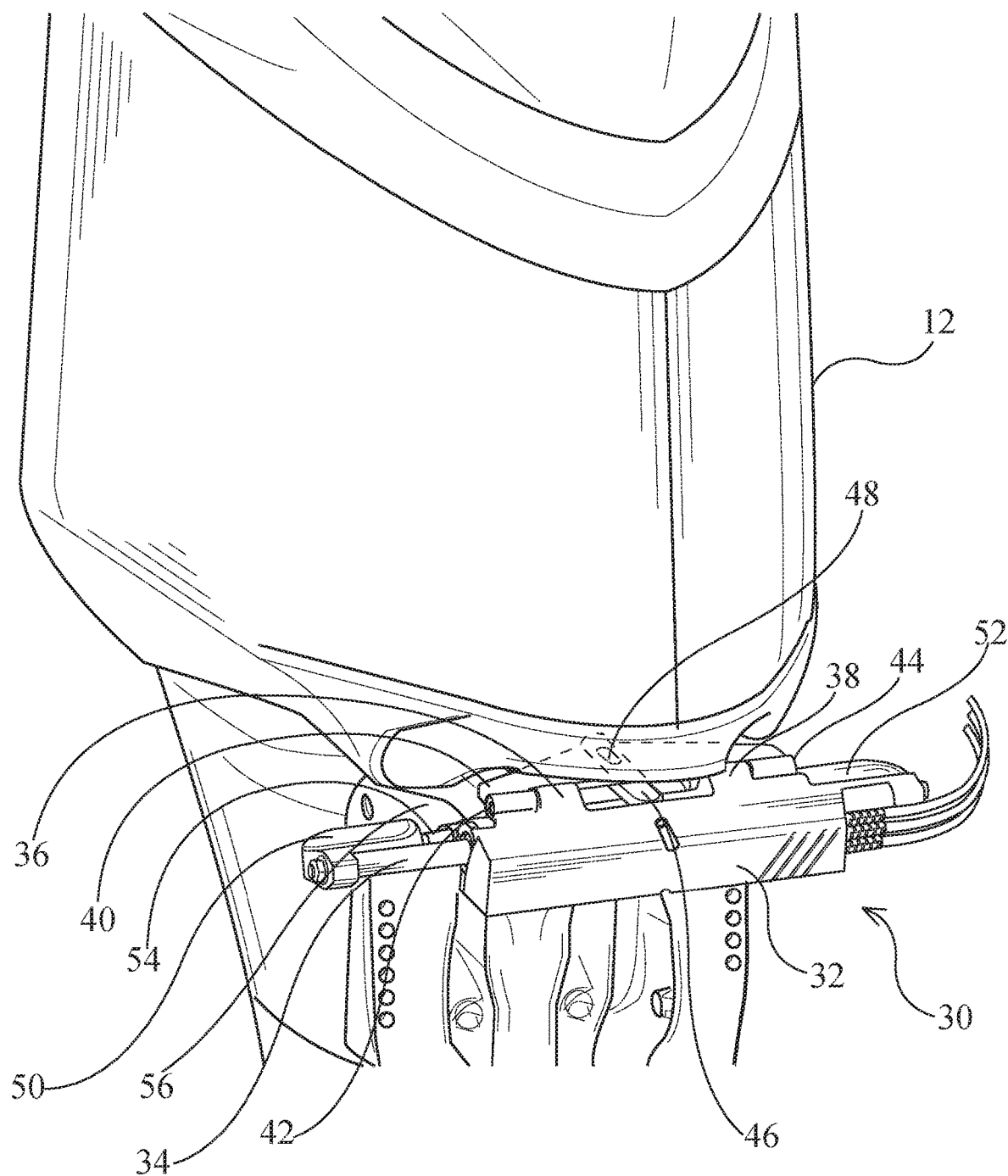
FIG. 2 is a perspective view of the propulsion unit and the electric actuator.

The port engine 12 of the marine vessel 10 is shown in greater detail in FIG. 2. The port engine 12 is provided with an electric actuator 30. The electric actuator 30 generally comprises a housing 32 with an output shaft 34 reciprocatingly received therein and spaced-apart housing arms 36 and 38 which extend radially outward of the housing 32. A pivot plate 40 can be coupled to each of the housing arms 36 and 38 by respective pivot pins 42 and 44. The pivot plate 40 extends between the housing arms 36 and 38. The pivot plate 40 can pivot about the pivot pins 42 and 44. A steering member or tiller 46 of the port engine 12 can be pivotably coupled to the pivot plate 40 by a tiller pin 48. There are support arms 50 and 52 which connect respective ends of the output shaft 34 of the electric actuator 30 to a support rod 54 and a tilt tube 56 of the port engine 12. The support arms 50 and 52 inhibit axial and rotational movement of the output shaft 34 of the electric actuator 30 relative to the marine vessel 10 while the housing 32 of the electric actuator 30 reciprocates along the output shaft 34 and linearly relative to the marine vessel 10. This relative linear movement of the housing 32 causes the tiller 46 of the port engine 12 to pivot and thereby cause the port engine to be steered in a conventional manner. It will be understood by a person skilled in the art that the starboard engine 14 has a substantially identical structure and functions in a substantially similar manner. The starboard engine is accordingly not described in detail herein.

Figure 3:
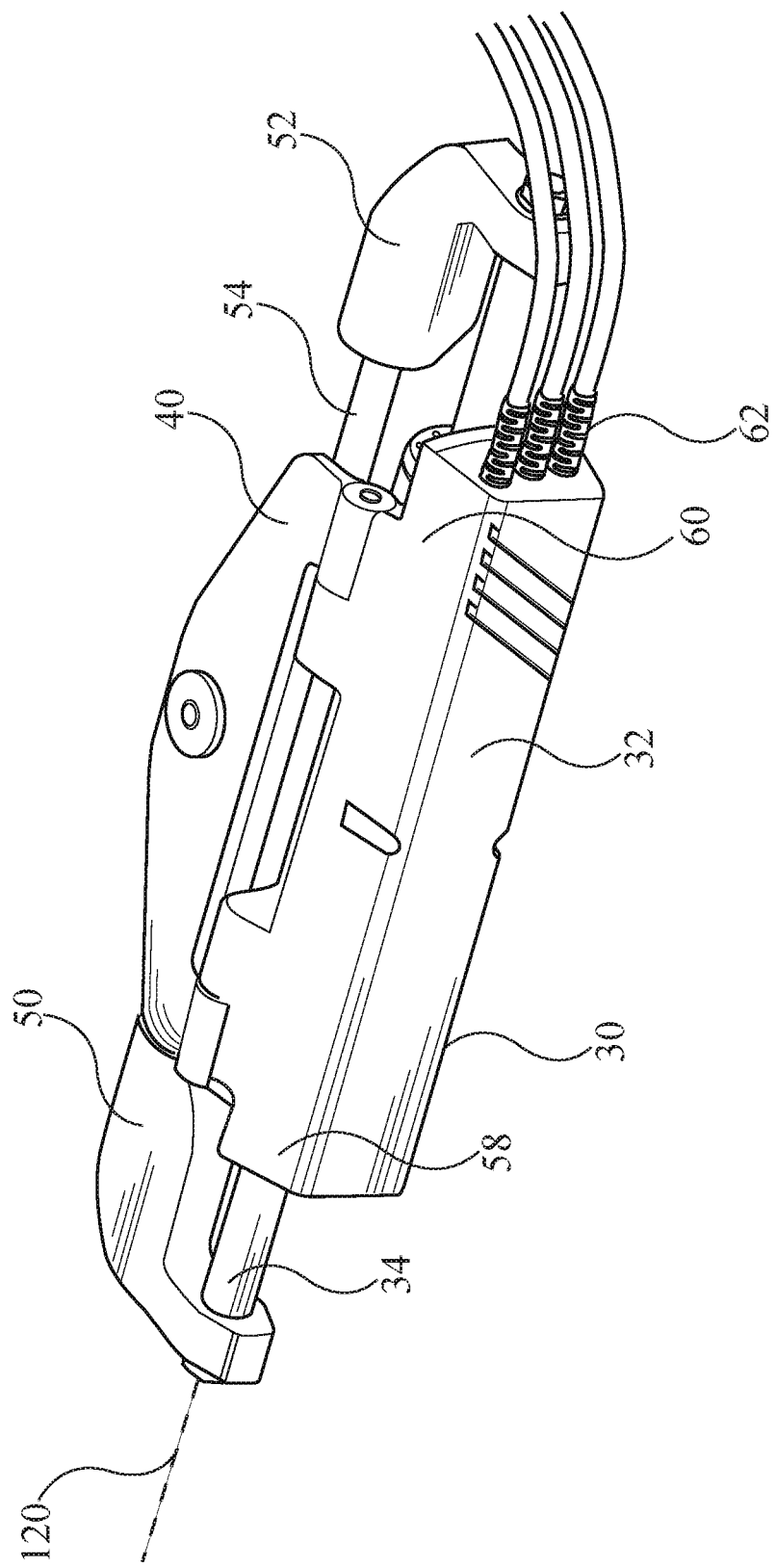
FIG. 3 is a perspective view of the electric actuator.
Figure 4:
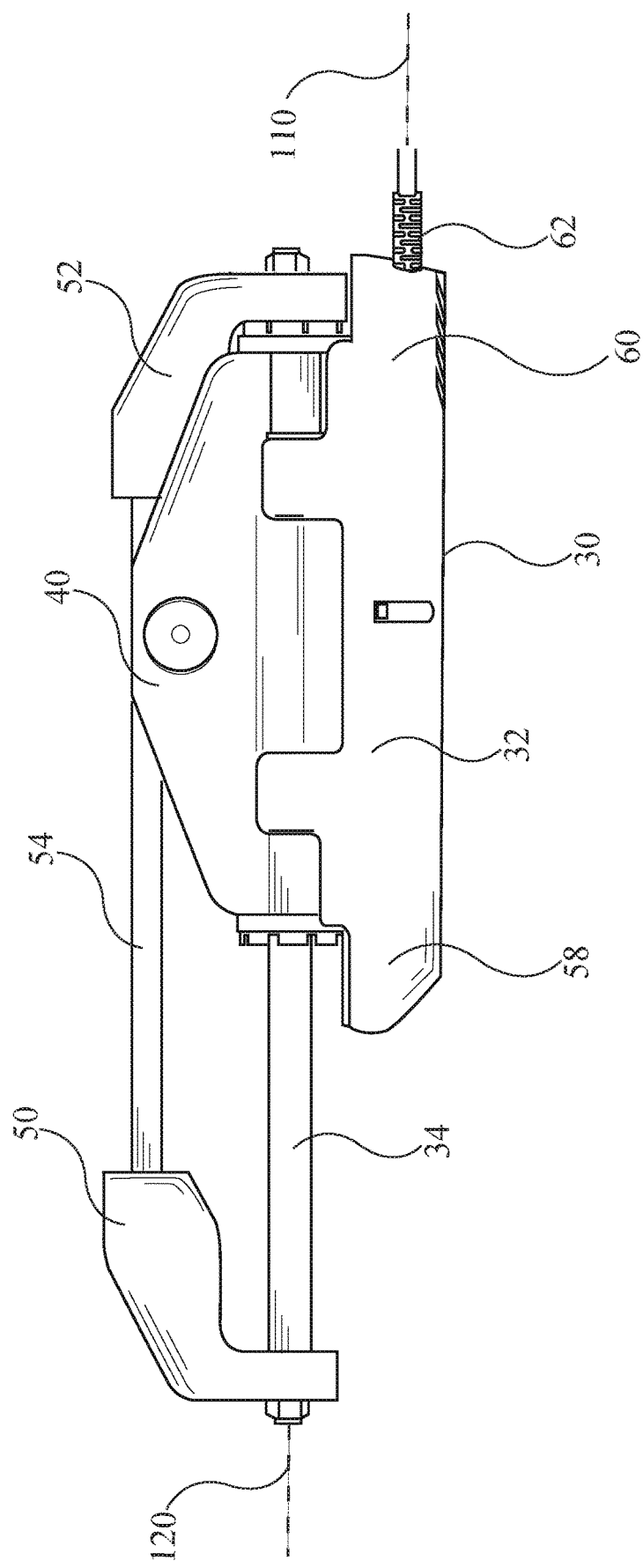
FIG. 4 is a top plan view of the electric actuator.

The electric actuator 30 is shown in greater detail in FIG. 3. The housing 32 of the electric actuator 30 has a T-shaped profile with longitudinally extending arm portions 58 and 60. The longitudinally extending arm portions 58 and 60 of the housing 32 extend longitudinally overlapping the support arms 50 and 52 when the electric actuator 30 strokes to hard over positions, as shown in FIG. 4, for the longitudinally extending arm portion 60 and the support arm 52. Wiring 62 is connected to the housing 32 of the electric actuator 30 at the longitudinally extending arm portion 60 along a longitudinal axis 110 which is generally parallel to a longitudinal axis 120 of the output shaft 34 of the electric actuator 30. This may offer advantages in clearance.

Figure 5:
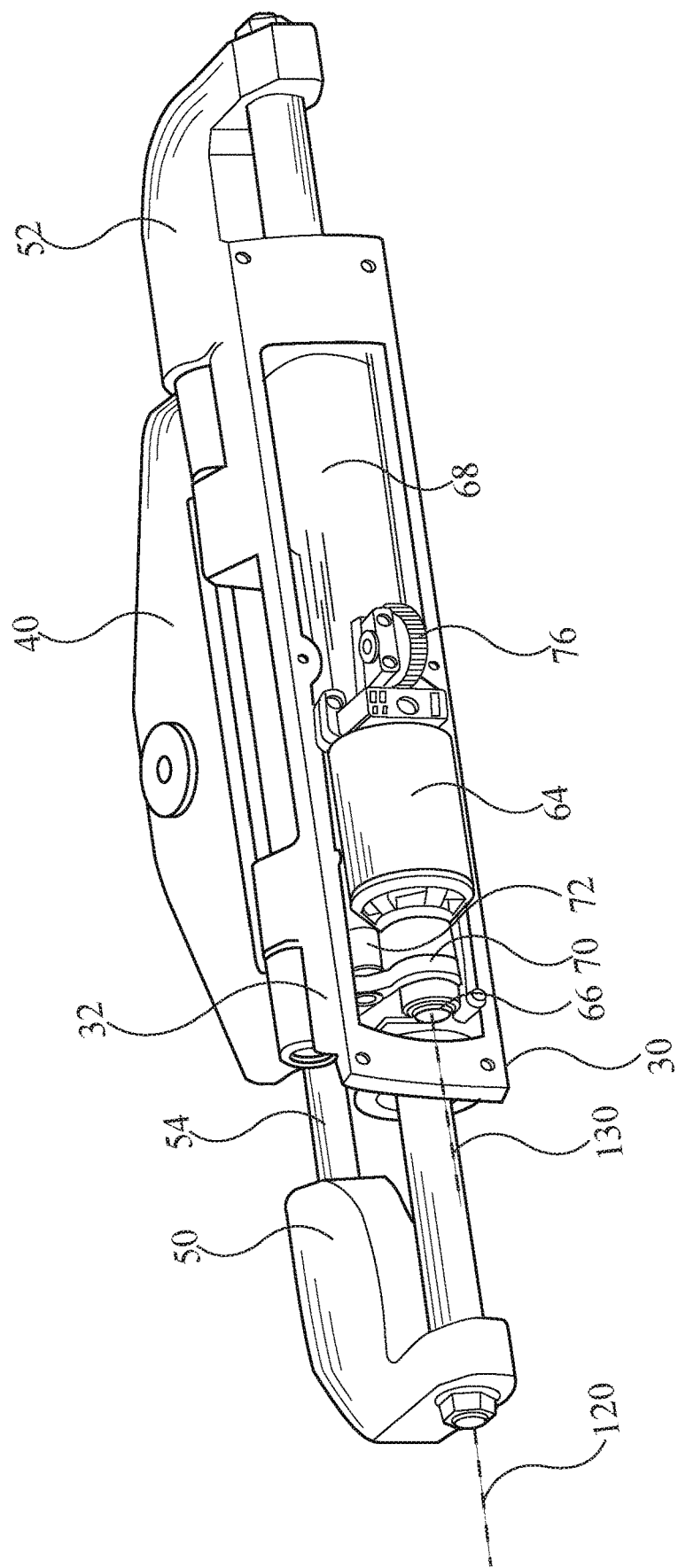
FIG. 5 is a partly broken away view of the electric actuator.
Figure 7:
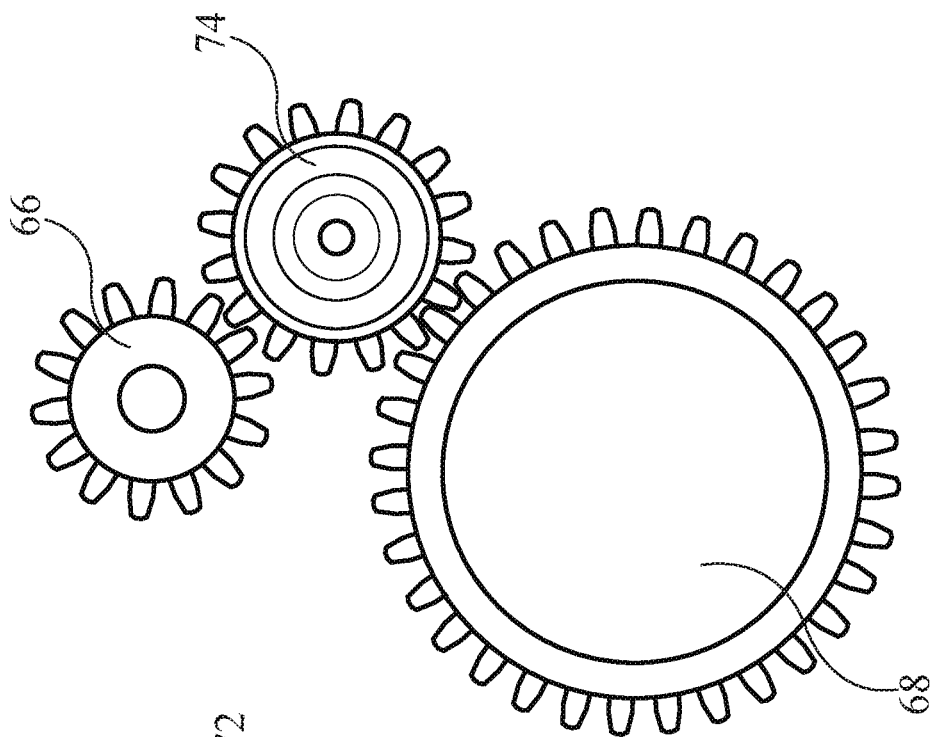
FIG. 7 is a schematic view showing an idler gear coupling an output shaft of a motor of the electric actuator to a rotor of the electric actuator.
Figure 6:
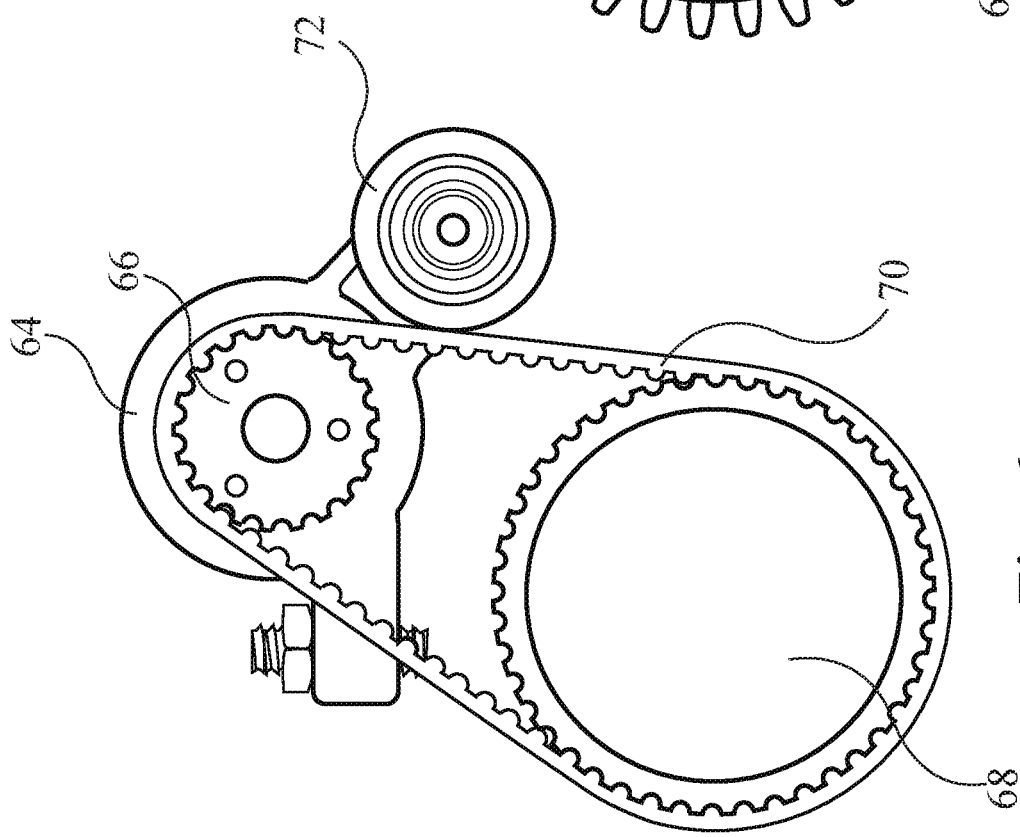
FIG. 6 is a schematic view showing a belt coupling an output shaft of a motor of the electric actuator to a rotor of the electric actuator.

FIG. 5 shows a partly broken away view of the electric actuator 30. A motor 64 of the electric actuator 30 is disposed such that an output shaft 66 of the motor 64 has a longitudinal axis 130 which is generally parallel to the longitudinal axis 120 of the output shaft 34 of the electric actuator 30. The longitudinal axis 120 of the output shaft 34 of the electric actuator 30 and the longitudinal axis 130 of the output shaft 66 of the motor 64 are orthogonal to a longitudinal axis of the marine vessel 10. In this example, the output shaft 66 of the motor 64 is coupled to a rotor 68 of the electric actuator 30 by a drive mechanism that includes a belt 70, as best shown in FIG. 6, in order to transmit rotational motion from the output shaft 66 of the motor 64 to a rotor 68 of the electric actuator 30. In this example, the belt 70 is provided with a tensioner 72. Use of the belt 70 to couple the output shaft 66 of the motor 64 to the rotor 68 of the electric actuator 30 may dampen out the load impulses from the port engine 12. However, in other examples, the drive mechanism may employ other means such as an idler gear 74, shown in FIG. 7, to couple the output shaft 66 of the motor 64 to the rotor 68 of the electric actuator 30. The drive mechanism is on a plane radial to the longitudinal axis 120 of the output shaft 34 of the electric actuator 30.

Figure 8:
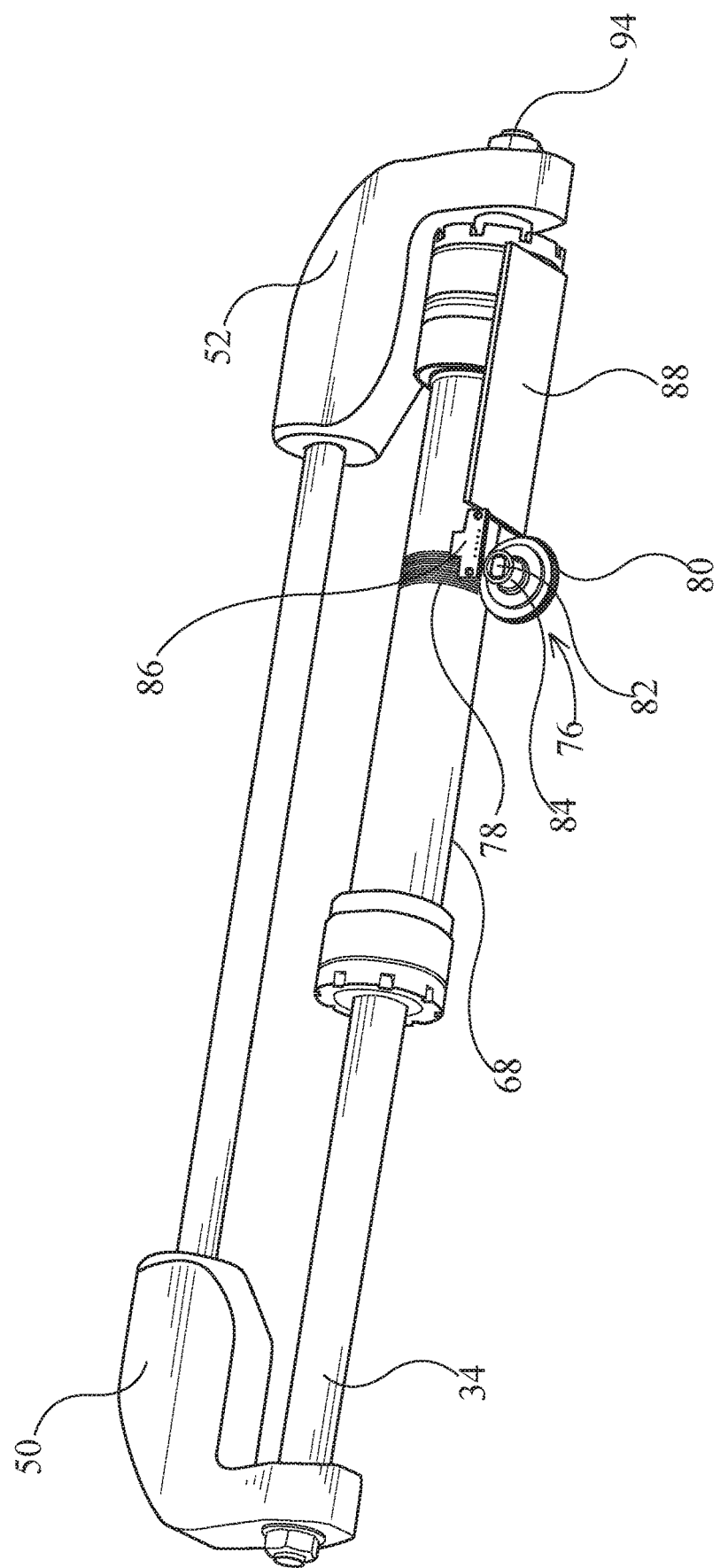
FIG. 8 is a fragmentary perspective view of the electric actuator showing a position sensor thereof.

Referring back to FIG. 5, the electric actuator 30 also includes a position sensor 76 for sensing a position of the rotor 68 of the electric actuator 30. An actual steering position is determined based on the position of the rotor 68. The position sensor may be a rotary positions sensor, or a linear position sensor with a helical magnetic element, or any other suitable sensor. The position sensor 76 employs a gear reduction which, in this example, is a worm-like drive best shown in FIG. 8. There is an outer threading 78 on the rotor 68 which engages a driven sensor gear 80. There is a magnet 82 disposed on the end of a shaft 84 which extends axially from the driven sensor gear 80. A position of the magnet is sensed by a non-contact position sensor element 86. A controller 88, disposed within the housing 32 of the electric actuator, reads the sensor element 86 as the actual steering position. The controller also reads a steering command from the steering wheel 18 and then drives the motor 64 based on a difference between the steering command and the actual steering position.

Figure 9:
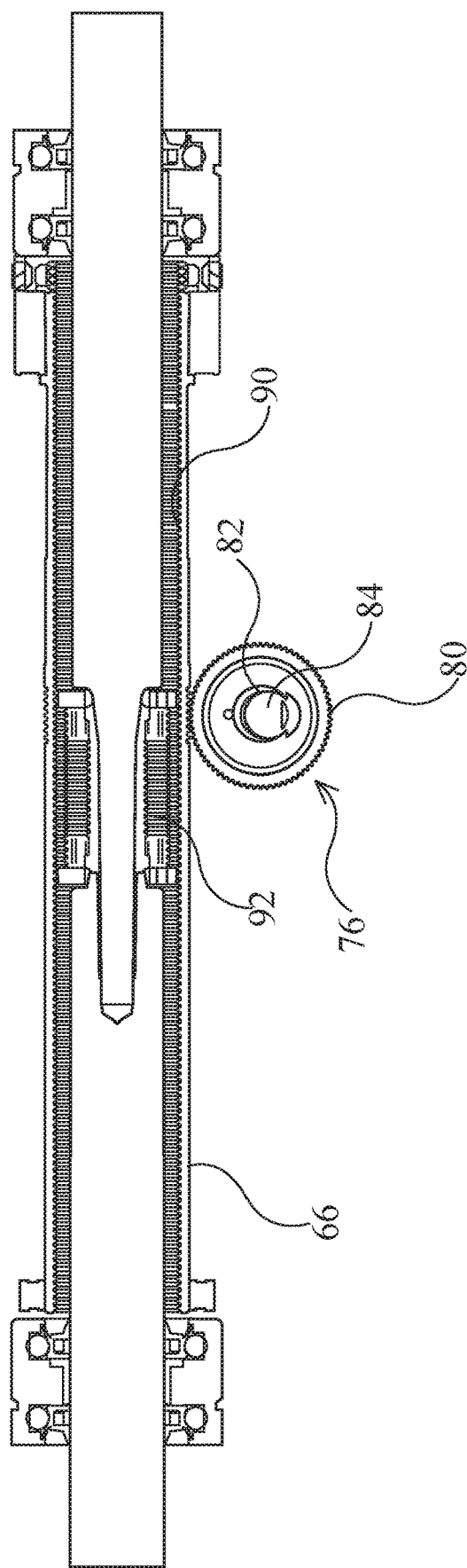
FIG. 9 is a fragmentary, sectional elevation view of the electric actuator showing the position sensor thereof.

The rotor 68 also has inner threading 90 which is shown in FIG. 9. The inner threading 90 of the rotor 68 engages a roller screw assembly 92. The roller screw assembly is axially and rotationally inhibited by the support arms 50 and 52. It is possible to remove a nut at the support arms, for example nut 94 shown in FIG. 8, to manually reposition the housing. In this example, the lead of a roller screw assembly 92 of the electric actuator 30 is 0.1 inches, so for an 8.0 inch stroke, the rotor 68 of the electric actuator 30 turns approximately eighty times. A reduction gear of >80:1 is accordingly employed so the driven sensor gear 80 never rotates more than one rotation. Disposing the position sensor 76 on the rotor 68 places the position sensor 76 closer to the output of the electric actuator 30 to avoid fault.

Figure 10:
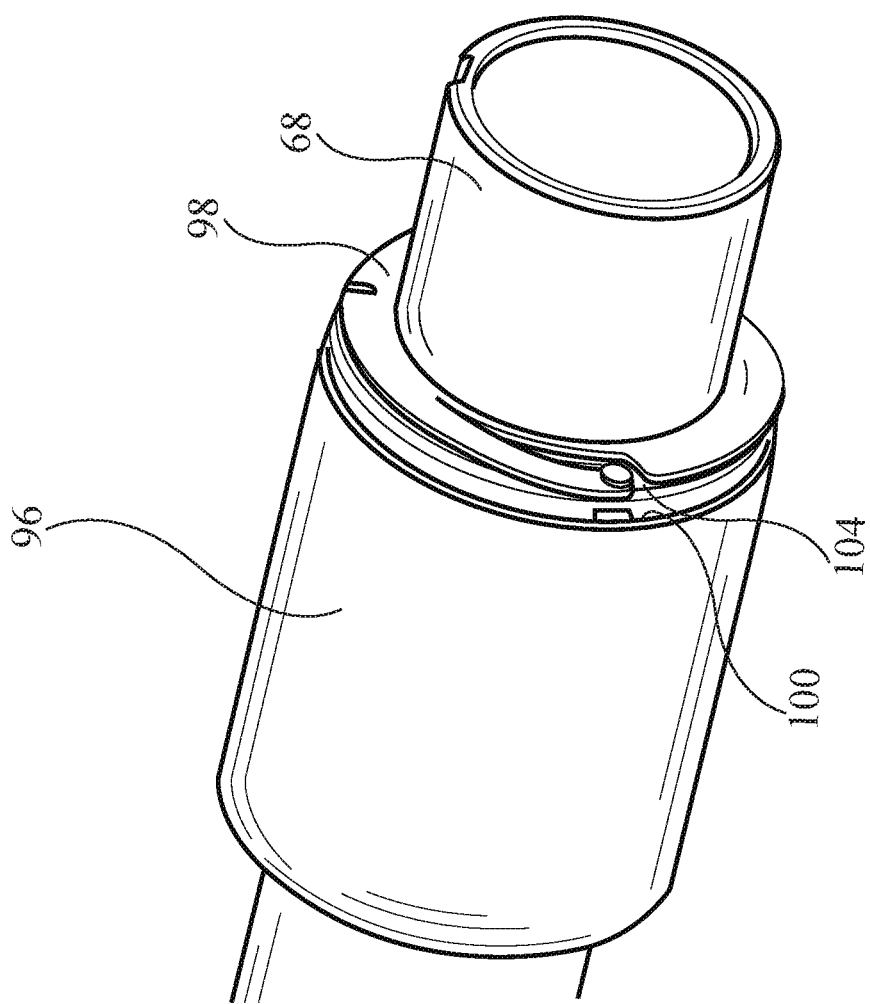
FIG. 10 is a fragmentary perspective view of the electric actuator showing a brake thereof.

The electric actuator 30 also includes a clutch 96, which may function as a brake, which is coaxial to the rotor 68 and shown in FIGS. 10 and 11. The clutch 96 is generally similar to the clutch disclosed in International Patent Application Publication No. WO/2016/004532 in the name of Davidson et al. However, in this example, there is a flexure 98 directly coupled to the rotor 68 without a hub. The flexure 98 pulls back a brake pad 100 when the clutch 96 is released and the flexure 98 transmits torque from the rotor 68 when the clutch 96 is engaged. There is a bearing 102 which clamps the flexure 98 against a flange 104 on the rotor 68 of the electric actuator 30. There is also a lock nut 106 which allows the clutch 96 to be manually released.

Figure 13:
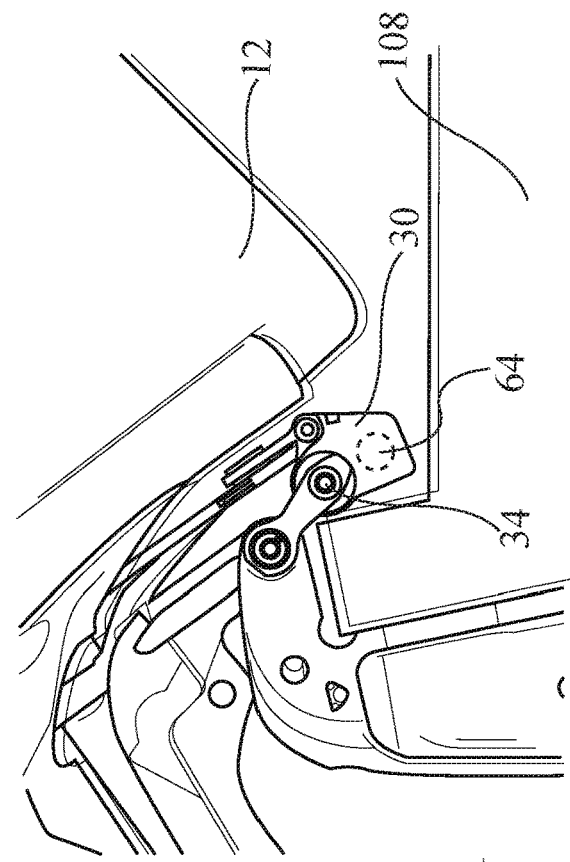
FIG. 13 is a side elevation view showing a disposition of the electric actuator when the propulsion unit is tilted up.
Figure 12:
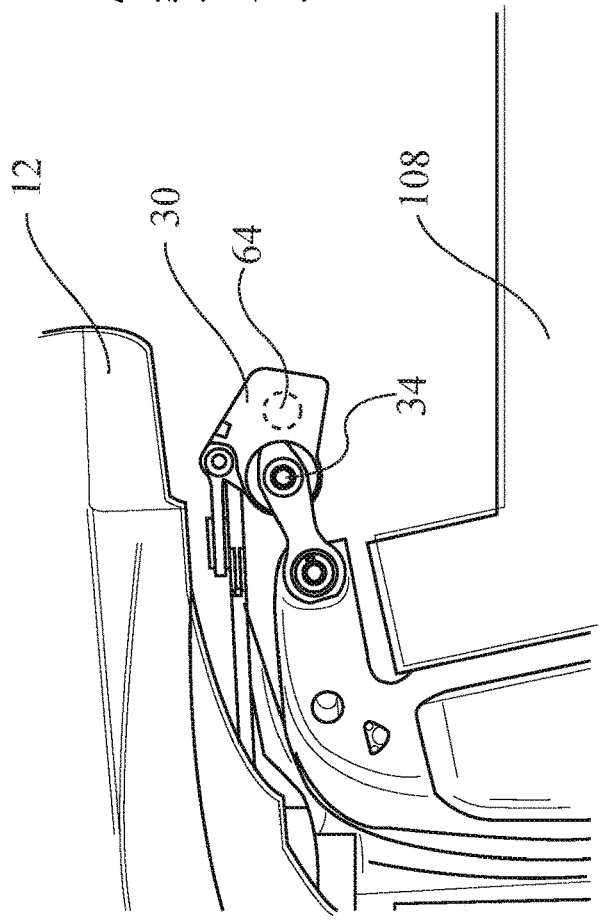
FIG. 12 is a side elevation view showing a disposition of the electric actuator when the propulsion unit is tilted down.

The electric actuator 30 has an envelope such that the motor 64 of the electric actuator 30 is disposed, relative to the marine vessel 10, in front of the output shaft 34 of the electric actuator 30 in the tilted down position and the tilted up position, and all tilt positions therebetween, as shown in FIGS. 12 and 13. The motor 64 of the electric actuator 30 is also disposed under the port engine 12 and above a splashwell 108 of the marine vessel in the tilted down position and the tilted up position, and all tilt positions therebetween, as shown in FIGS. 12 and 13. The housing of the electric actuator is pivotable when the propulsion unit is pivotable.

Figure 14:
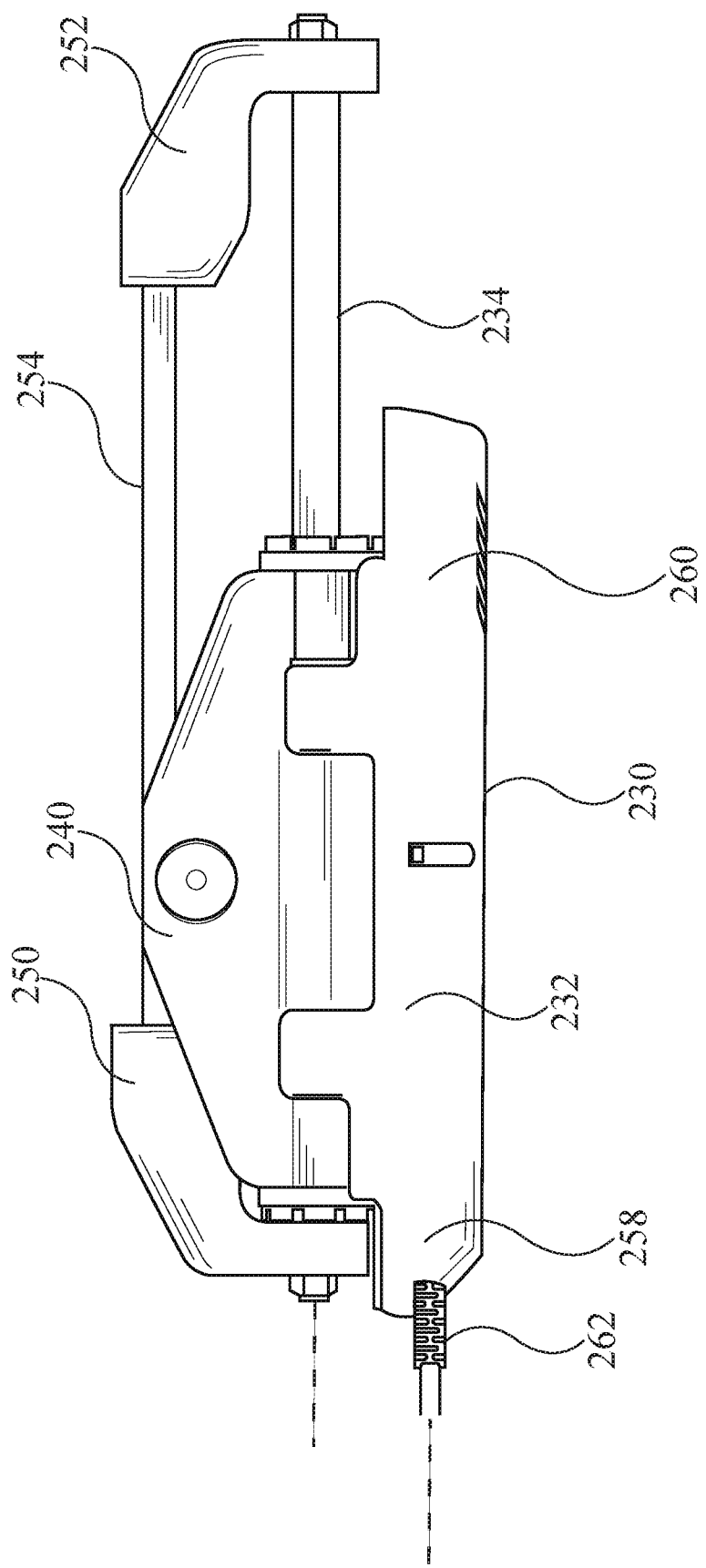
FIG. 14 is a top plan view of another electric actuator.
Figure 15:
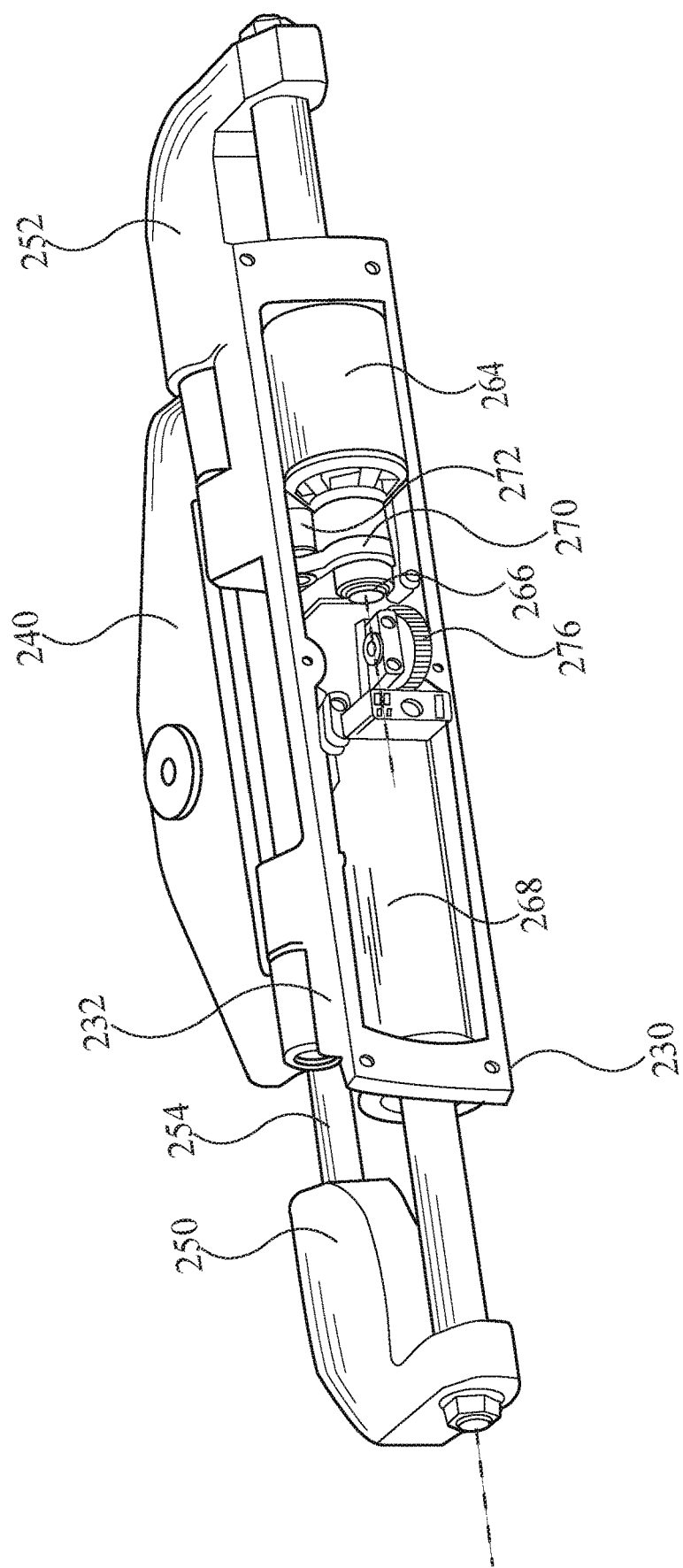
FIG. 15 is a partly broken away view of the electric actuator of FIG. 14.
Figure 16:
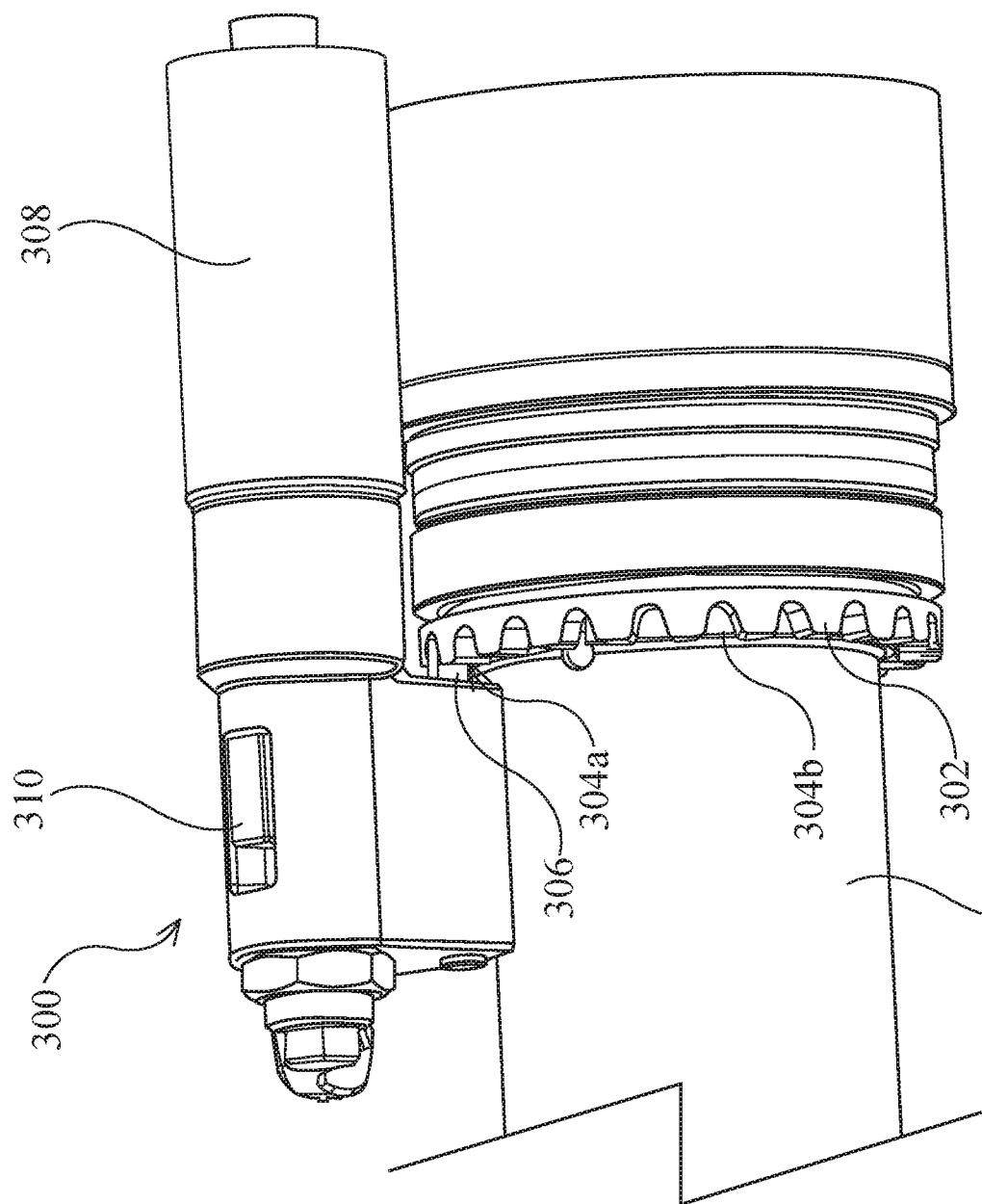
FIG. 16 is a fragmentary perspective view of the electric actuator of FIG. 14 showing a brake thereof in the engaged position.
Figure 17:
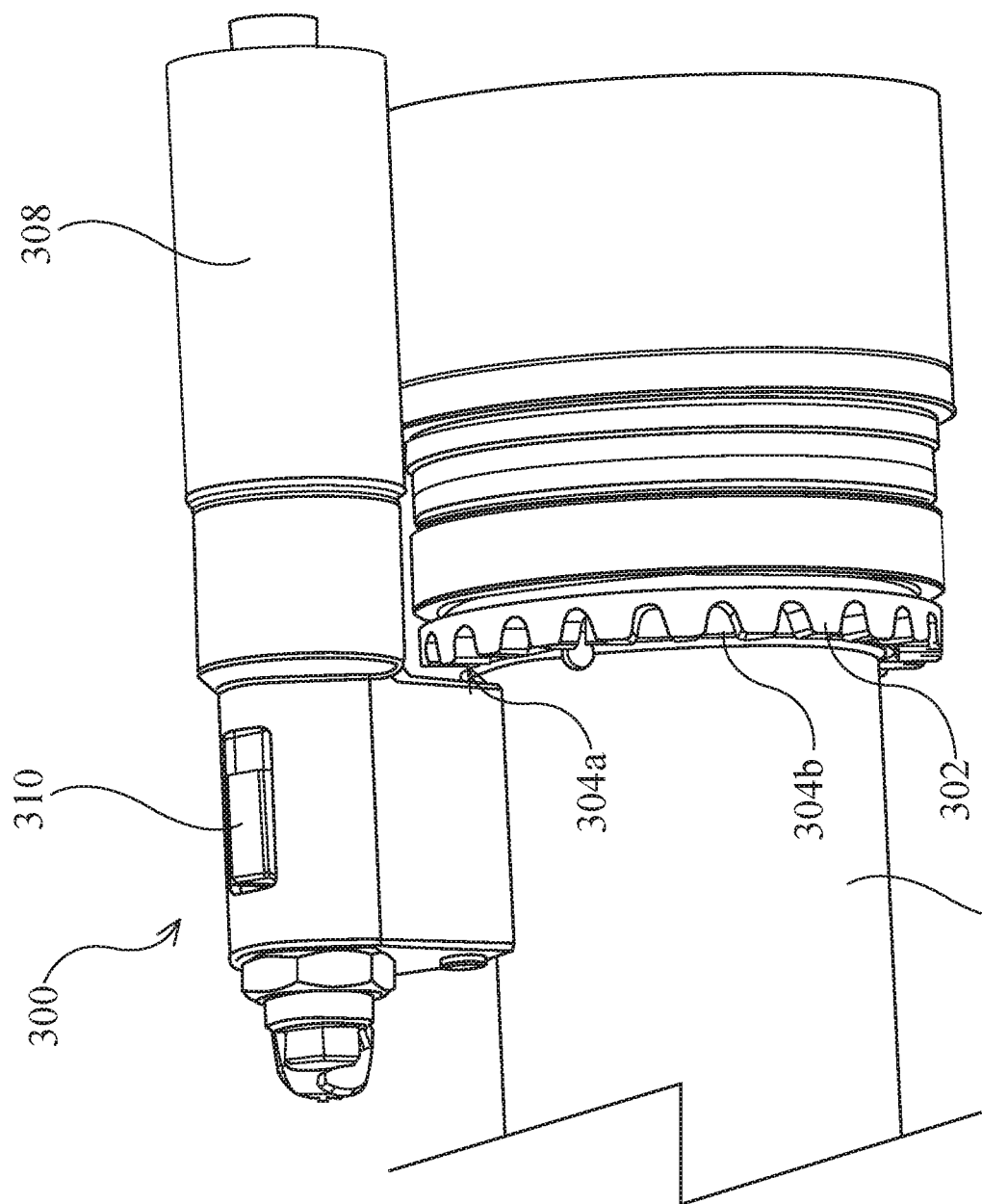
FIG. 17 is a fragmentary perspective view of the electric actuator of FIG. 14 showing the brake thereof in the released position.

Another actuator 230 is shown in FIGS. 14 and 15. The actuator 230 is generally similar to the actuator 30, as shown in FIGS. 4 and 5, with the following notable exceptions. The actuator 230 shown in FIGS. 14 and 15 is a mirror image of the actuator 30, shown in FIGS. 4 and 5, with like parts given like reference numerals in the 200 series. Furthermore, the actuator 230 is provided with a brake 300 which is shown in FIGS. 16 and 17. The brake 300 includes a brake pad 302 secured to the rotor 268. The brake pad 302 is generally annular and is circumambient to the rotor 268. The brake pad 302 has a plurality of radial openings, for example, radial openings 304a and 304b.

The brake 300 is in an engaged position when a pin 306 engages one of said radial openings, for example, said radial opening 304a as shown in FIG. 16. The brake 300 is provided with a solenoid 308 which, when de-energized and as shown in FIG. 16, allows the brake to be in the engaged position with a pin 306 engaging one of said radial openings 304a. A biased slider 310 is coupled to the pin 306 and biases the pin 306 to engage one of said radial openings 304a. However, when the solenoid 308 is energized, the slider 310 is pushed away from the brake pad 302 and the pin 306 disengages from the brake pad 302, as shown in FIG. 17, when the brake is in the released position. Accordingly, when the electric actuator 230 is not powered the brake 300 is in the engaged position. This prevents the electric actuator 230 from being back driven. When the electric actuator is powered then the brake 300 is released to allow steering. The slider 310 allows for manual override by a user.

It will be understood by a person skilled in the art that many of the details provided above are by way of example only, and are not intended to limit the scope of the invention which is to be determined with reference to the following claims.

What is claimed is:

1. An electric actuator for a marine steering system, the electric actuator comprising:
    a housing;
    an output shaft reciprocatingly received by the housing;
    a rotor disposed within the housing and coupled to the output shaft of the electric actuator, rotation of the rotor causing the output shaft of the electric actuator to reciprocate relative to the housing;
    a motor disposed within the housing, the motor having an output shaft coupled to the rotor, wherein a longitudinal axis of the output shaft of the motor is parallel with a longitudinal axis of the output shaft of the electric actuator; and
    a drive mechanism disposed within the housing, the drive mechanism coupling the output shaft of electric actuator to the rotor, wherein the drive mechanism is on a plane normal to a longitudinal axis of the output shaft of the motor.

2. The electric actuator as claimed in claim 1 wherein the drive mechanism is a tensioned drive mechanism.

3. The electric actuator as claimed in claim 1 wherein the drive mechanism includes a belt which couples the output shaft of the electric actuator to the rotor.

4. The electric actuator as claimed in claim 3 wherein the belt is provided with a tensioner.

5. The electric actuator as claimed in claim 1 wherein the drive mechanism includes an idler gear coupling the output shaft of the electric actuator to the rotor.

6. The electric actuator as claimed in claim 1 wherein wiring is connected to the electric actuator along a longitudinal axis which is generally parallel to the longitudinal axis of the output shaft of the electric actuator.

7. The electric actuator as claimed in claim 1 further including a rotary position sensor disposed on the rotor for sensing a position of the rotor.

8. The electric actuator as claimed in claim 7 wherein the rotary position sensor senses an actual steering position.

9. The electric actuator as claimed in claim 7 wherein the rotary position sensor employs a gear reduction.

10. The electric actuator as claimed in claim 7 wherein the rotary position sensor employs a gear reduction so that a driven sensor gear never rotates more than one rotation.

11. The electric actuator as claimed in claim 1 further including a clutch directly coupled to the rotor.

12. The electric actuator as claimed in claim 1 wherein the clutch functions as a brake.

13. The electric actuator as claimed in claim 1 wherein the housing has a T-shaped profile with longitudinally extending arm portions.

14. A steering system for a marine vessel, the steering system comprising:
    a propulsion unit including a tilt tube, a support rod received by the tilt tube, and a tiller; and
    an electric actuator for imparting steering movement to the propulsion unit, the electric actuator including:
        a housing;
        an output shaft reciprocatingly received by the housing;
        a rotor disposed within the housing and coupled to the output shaft of the electric actuator, rotation of the rotor causing the output shaft of the electric actuator to reciprocate relative to the housing; and
        a motor disposed within the housing, the motor having an output shaft coupled to the rotor, wherein a longitudinal axis of the output shaft of the motor is parallel with a longitudinal axis of the output shaft of the electric actuator; and a drive mechanism disposed within the housing, the drive mechanism coupling the output shaft of electric actuator to the rotor, the drive mechanism being on a plane normal to a longitudinal axis of the output shaft of the motor;

a pivot plate pivotably connected to the tiller of the propulsion unit, the pivot plate rotationally constraining the housing of the electric actuator to provide reaction torque for rotation of the rotor; and support arms which connect respective ends of the output shaft to the support rod of the propulsion unit, the support arms providing rotational constraint to the output shaft and the support arms inhibiting axial movement of the output shaft relative to the marine vessel while the housing of the electric actuator reciprocates linearly along the output shaft, wherein the motor of the electric actuator is disposed, relative to the marine vessel, in front of the output shaft of the electric actuator in a tilted down position and a tilted up position.

15. The steering system as claimed in claim 14 wherein the electric actuator is disposed under an engine pan of the propulsion unit and above a splashwell of the marine vessel in the tilted down position and the tilted up position.

16. The steering system as claimed in claim 14 wherein the housing of the electric actuator is pivotable when the propulsion unit is pivotable.

17. The steering system as claimed in claim 14 wherein the housing has a T-shaped profile with longitudinally extending arm portions, wherein the longitudinal extending arm portions overlap the support arms when the electric actuator strokes to hard over positions.

18. An electric actuator for a marine steering system, the electric actuator comprising:

a housing;

an output shaft reciprocatingly received by the housing;

a rotor disposed within the housing and coupled to the output shaft of the electric actuator, rotation of the rotor causing the output shaft of the electric actuator to reciprocate relative to the housing;

a motor disposed within the housing, the motor having an output shaft coupled to the rotor, wherein a longitudinal axis of the output shaft of the motor is parallel with a longitudinal axis of the output shaft of the electric actuator; and a rotary position sensor disposed on the rotor for sensing a position of the rotor, the rotary position sensor employing a gear reduction so that a driven sensor gear never rotates more than one rotation.

19. The electric actuator as claimed in claim 18 wherein the rotary position sensor senses an actual steering position.

20. The electric actuator as claimed in claim 18, wherein the gear reduction includes a crossed-axis type gear arrangement.

* * * * *